2,955,345
Patented Oct. 11, 1960

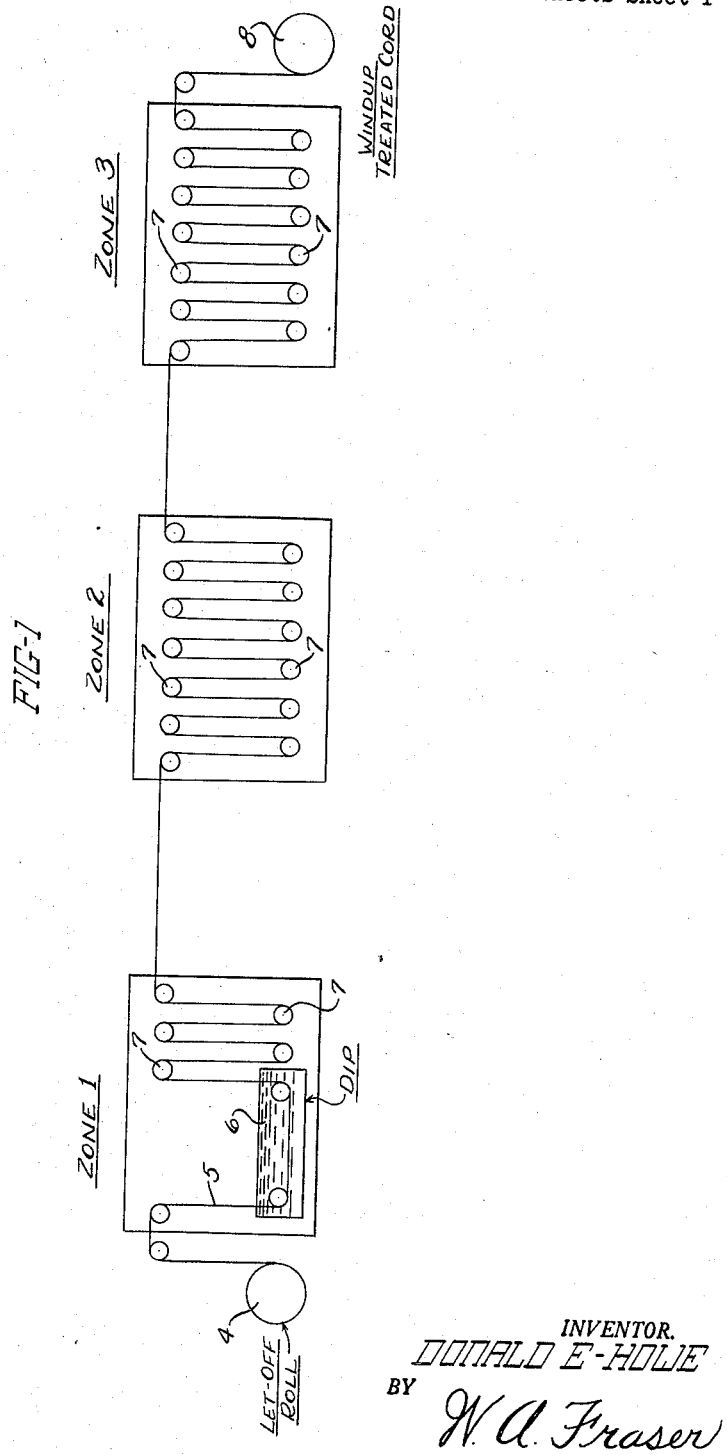

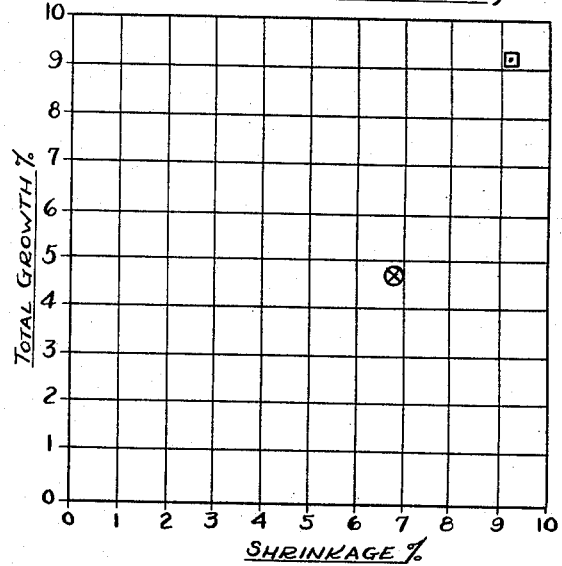

2,955,345

TEXTILE ELEMENT TREATMENT

Donald E. Howe, Akron, Ohio, assignor to The Firestone Tire & Rubber Company, Akron, Ohio, a corporation of Ohio Filed Aug. 15, 1955, Ser. No. 528,406

6 Claims. (Cl. 28—72)

This invention relates to the treatment of synthetic textile elements and the like and more particularly to means for processing heat shrinkable fibers, filaments, cord and fabric sheet continuously and on a commercial scale.

Heat shrinkable textile elements such as polyamide fibers, filaments, cords and fabrics contain a high degree of dimensional instability as evidenced by shrink and growth characteristics, which are manifest when such continuous textile elements are continuously processed by equipment in train under varying conditions of moisture, heat and tension and then are laminated by means of heat and pressure into composite articles such as vulcanized tires. Readjustment of the polyamide element by growth or shrinkage in such a composite article during and after heat processing results in inferior articles and poor performance of such articles when put to the intended use. Attempts to overcome and eliminate these undesirable characteristics have not been entirely successful.

The present invention reduces simultaneously the shrinkage and growth characteristics of continuous heat shrinkable textile elements by subjecting such elements to novel conditions of tension, high temperature, controlled stretch and controlled relaxation at high temperatures in three treating zones in train.

It is therefore an object of the invention to provide means for continuously processing heat shrinkable textile elements; for processing such elements through treatment zones at high temperatures; for subjecting such elements to successive zones of treatment wherein high temperature and stretch tension are applied to the elements. Yet, a further object of the invention is to pass continuous polyamide textile elements through three zones of treatment wherein the elements are stretched in the first two zones and relaxed a controlled amount under high temperature in the third zone, all zones being maintained at predetermined temperatures.

The invention will be described in the form of processing nylon fabric, for use in composite vulcanized rubber articles such as tires and will be more fully understood by reference to the specification, claims and drawings of which:

Figure 1 is a diagrammatic representation of a typical method of practicing the invention.

Figure 2 is a chart showing the properties of shrinkage and growth in percent found in polyamide textile elements processed in the novel manner.

Referring to Figure 1, letoff roll 4 feeds nylon fabric 5 continuously through processing zones 1, 2 and 3, having predetermined conditions of tension, relaxation and temperature to windup roll 8.

Zone one is provided with tank 6 containing rubber-polyamide adhesion promoting dips in which fabric 5 is immersed. The temperature in zone one may be adjusted to dry the fabric after it is dipped or drying may take place in zone two.

All three zones are provided with conventional drive rolls 7 or other drive means which are driven at predetermined speeds to apply predetermined tension accurately to either stretch or relax the passing fabric 5. Each zone is also provided with a conventional source of heat not shown for applying a predetermined temperature to the fabric, the zones being insulated one from the other for accurate temperature control.

TESTS

To evaluate the nylon cord treated by the invention, two tests were run: (1) "Total Growth Percent" and (2) "Percent Shrink."

"Total Growth Percent" was arrived at by placing a length of cord vertically in a cold oven and securing both ends. The oven was heated in 30 minutes to 284° F. and a 3 pound load applied to the lower end of the cord. After a 12 second interval, the length of the cord was measured and the increase in length calculated in percent of original length. After a 1,300 minute interval, a second measurement of length was made, the increase in length again calculated in percent of original length. The sum of the two measurements in percent was reported as "Total Growth Percent."

"Percent Shrink" was determined by laying an unrestrained length of nylon cord in an oven at 320° F. for 30 minutes, measuring the length of the cord and reporting the percent decrease in length as "Percent Shrink."

*Example I*

To test the invention, a sheet of nylon fabric having 35 cord ends to the inch of 840/2 cord was passed through the 3 zone system under the following conditions:

| | Zone I | Zone II | Zone III |
|---|---|---|---|
| Temperature °F. | 80 | 400 | 165 |
| Stretch Applied to Cord During Passage through zone percent | 6 | 6 | −4 |
| Time in zone Sec. | 30 | 20 | 20 |

The resulting properties of the treated cord were better than the untreated cord as indicated below:

| | Cord of Example I | Untreated Cord Control |
|---|---|---|
| Total Growth, Percent | 4.49 | 9.55 |
| Shrink in Percent | 7.3 | 8.70 |

*Example II*

A sheet of nylon fabric having 25 ends to the inch of 840/2 cord was run under the identical conditions of Example I. Again the growth and shrink characteristics of the treated cord surpassed those of the untreated control as follows:

|  | Cord of Example II | Untreated Cord Control |
|---|---|---|
| Total Growth, Percent | 4.49 | 9.55 |
| Shrinkage in Percent | 6.40 | 8.70 |

The following table lists the results of other fabric sheets of various end counts treated under the conditions of Example I.

|  | End Count | Total Growth, Percent | Shrinkage In Percent |
|---|---|---|---|
| Example III | 35 | 4.96 | 7.5 |
| Example IV | 35 | 4.94 | 6.9 |
| Example V | 25 | 5.80 | 7.1 |
| Example VI | 18 | 4.94 | 6.9 |
| Example VII | 18 | 4.87 | 6.0 |
| Control (Untreated) |  | 9.55 | 8.7 |

In all examples the novel treatment gave fabric with improved growth and shrinkage characteristics. Broadly, the invention comprises heat setting nylon elements with controlled relaxation after hot stretching at high tension to reduce shrinkage without a corresponding growth increase. It has been found that temperature treatment above 450° F. for more than 20 seconds in any of the zones seriously lowers the strength of the treated cord. The temperature in the second zone of treatment may range from 350 to 430° F. but preferably is about 400° F. Temperatures in the third zone are lower than second zone temperatures ranging from 150° F. to 180° F. with approximately 170° F. preferred.

The function of the first zone treatment in one modification of the invention is to dip and partially dry the cord in preparation for hot stretching and hot relaxation in zones two and three respectively. Zone one is held at a temperature of between 60° F. and 100° F. but preferably about 80° F. while the cord travels through that zone. Travel through zone one takes about 30 seconds. Six percent stretch has been found satisfactory in the first zone although from 4 to 8% stretch may be used with good effect. Since the cord is not completely dried in the first zone but passes to the second zone in a semi-wet state, a hot wet stretching at from 350 to 430° F. takes place in the first part of the second zone. This treatment is combined with a controlled relaxation at a temperature of from 150–180° F. in the third zone to give an improved element.

Referring to the chart, Figure 2 "Total Growth Percent" has been plotted as the ordinate and "Shrinkage Percent" has been plotted as the abscissa. For purposes of factory processing as well as for service of the finished composite article containing nylon fabric, the most desirable condition would be a fabric which had zero growth and zero shrink at all conditions of processing heat and tension. Referring to Figure 2, it is seen that the untreated fabric has very high shrinkage and growth. Under the conditions of processing as set out in the examples in view of the invention, the relaxation of the fabric in the third zone after high tension and high temperature treatment has lower shrinkage and growth.

While the preferred example has been described in the treatment of a nylon fabric, the invention relates as well to the treatment of nylon cord and nylon sheet and other heat shrinkable sheets and fibers of the nylon type such as those composed of polycaprolactam and other heat-shrinkable sheets and fibers composed of either polyethylene terephthalate or polyacrylonitrile.

When heat shrinkable textile elements comprised of polycaprolactam and the like such as nylon 6 are processed in view of the invention, a second zone temperature of 320 to 400° F. is desirable.

The use of polyethylene terephthalate textiles such as Dacron[1] in the invention requires a slightly higher temperature with a second zone range of from 350° F. to 450° F.

Conventional machinery is available for applying tension to sheets of fabric as wide as or wider than 61 inches in width having as many cords as 1,926 to the sheet. Such fabric is available on the market and is generally used in the construction of pneumatic tires.

The stretch of the cord in any zone may be defined as the increase in length of the cord in percent during the passage of the cord through the zone in question. Relaxation of the cord in any zone may be defined as the decrease in length of the cord in percent during the passage through the zone in question. The length of the cord entering any zone of treatment other than the first may be defined as its attained length. The original length of the cord may be defined as the length of the cord entering the first zone of treatment. When the stretch or relaxation of the cord is referred to as occurring in a particular zone and expressed as a percentage, the basis for computing such percentage, unless otherwise noted, shall be the increase or decrease in length of the cord within that zone divided by the length of the cord entering that zone. Thus, the percentages expressed for the first zone are based on the original length and the percentages expressed for zones other than the first are based on the attained length of the cord entering such zones.

Although only preferred forms have been described, it will be obvious to those skilled in the art other modifications may be made within the scope of the invention in view of the specification and within the scope of the following claims:

In the claims:
1. A method of treating a continuous nylon element comprising the steps of passing said element through a treatment zone to subject said element to stretch of from 4 to 16% of its original length at a temperature of from 350 to 450° F. and thereupon relaxing said element a controlled amount of from 2% of its attained length to an amount equal to the total imposed stretch but not exceeding 6% of its attained length at a lower temperature to thereby reduce the shrinkage and growth characteristics of said element.

2. A method of treating a continuous nylon element according to claim 1 wherein said element is relaxed at a temperature of 150° F. to 180° F.

3. A method of processing continuous nylon cord comprising the steps of passing said cord through a first treatment zone to stretch said cord from 4 to 8% of its original length, passing said cord through a second zone of treatment to subject it to a temperature of from 350–450° F. while stretching said cord from 4 to 8% of its attained length and passing said cord through a third zone of treatment to subject it to a temperature of 150° F. to 180° F. while relaxing said cord from 2–6% of its attained length to thereby reduce the shrinkage and growth characteristics of said cord.

4. A method of treating a continuous nylon fabric sheet comprising the steps of passing said sheet through a treatment zone at a temperature of from 60–100° F. while stretching said sheet about 6% of its original length, passing said sheet through a second zone of treatment at a temperature of from 350° F. to 430° F. while stretching the sheet about 6% of its attained length, and passing said sheet through a third zone of treatment at a temperature of from 150° F. to 180° F. while relaxing said sheet about 4% of its attained length to thereby reduce the growth and shrinkage characteristics of said sheet.

5. A method of treating a continuous nylon fabric sheet comprising the steps of passing said sheet through

---

[1] Sold by E. I. du Pont de Nemours & Company, Wilmington, Delaware.

a treatment zone at a temperature of from 60–100° F. while stretching said sheet from 2–8% of its original length, passing said sheet through a second zone of treatment at a temperature of from 350° F. to 430° F. while stretching the sheet from 2 to 8% of its attained length, and passing said sheet through a third zone of treatment at a temperature of from 150° F. to 180° F. while relaxing said sheet a controlled amount of from 2 to 6% of its attained length to thereby reduce the growth and shrinkage characteristics of said sheet.

6. A method of processing a continuous heat-shrinkable textile element which comprises stretching said element from 4 to 16% of its original length while subjecting it to a temperature of from 350 to 450° F. and thereupon relaxing said stretched element a controlled amount of from 2% of its attained length to an amount equal to the total imposed stretch but not exceeding 6% of its attained length at a lower temperature, whereby the shrink and growth characteristics of said element are reduced.

References Cited in the file of this patent
UNITED STATES PATENTS 2,584,779   Averns et al. ------------ Feb. 5, 1952